(12) United States Patent
Vardanyan et al.

(10) Patent No.: US 10,655,015 B2
(45) Date of Patent: May 19, 2020

(54) TIRE CRUMB-BASED BITUMEN POLYMER FOR PRODUCING A LOWER VISCOSITY ASPHALT WITH IMPROVED TOLERANCE TO HIGH TEMPERATURES

(71) Applicant: Argopro Group LLC, New York, NY (US)

(72) Inventors: Aghasi Vardanyan, Erevan (AM); Serji Amirkhanian, Clemson, SC (US)

(73) Assignee: Argopro Group LLC, New York, NY (US)

( * ) Notice: Subject to any disclaimer, the term of this patent is extended or adjusted under 35 U.S.C. 154(b) by 18 days.

(21) Appl. No.: 16/138,995

(22) Filed: Sep. 22, 2018

(65) Prior Publication Data
US 2020/0095424 A1    Mar. 26, 2020

(51) Int. Cl.
| C08L 95/00 | (2006.01) |
| C08K 5/47 | (2006.01) |
| C08K 5/098 | (2006.01) |
| C08K 5/18 | (2006.01) |
| C08K 11/00 | (2006.01) |

(52) U.S. Cl.
CPC .............. C08L 95/00 (2013.01); C08K 5/098 (2013.01); C08K 5/18 (2013.01); C08K 5/47 (2013.01); C08K 11/00 (2013.01)

(58) Field of Classification Search
CPC . C08K 3/00; C08K 5/47; C08K 5/098; C08K 5/18; C08K 11/00; C08L 95/00
USPC .......................................................... 524/59
See application file for complete search history.

(56) References Cited

U.S. PATENT DOCUMENTS

| 4,069,181 A | 1/1978 | Healy |
| 4,166,049 A | 8/1979 | Huff |
| 4,244,841 A | 1/1981 | Frankland |
| 6,265,454 B1 | 7/2001 | McNutt |
| 6,270,657 B1 | 8/2001 | Moore |
| 6,569,351 B1 | 5/2003 | Baumgardner |
| 7,384,468 B2 | 6/2008 | Butler |
| 7,833,338 B2 | 11/2010 | Crews |
| 9,102,834 B2 | 8/2015 | Butz |
| 2005/0203197 A1* | 9/2005 | Tang .................. B29B 17/0026 521/41 |
| 2006/0124031 A1* | 6/2006 | Butler .................... C08L 95/00 106/269 |
| 2006/0223915 A1 | 11/2006 | Stephens |
| 2009/0084287 A1 | 4/2009 | Partanen |
| 2011/0172365 A1 | 7/2011 | Meredith |
| 2012/0220725 A1* | 8/2012 | Hidalgo .................... C08L 9/00 525/186 |
| 2015/0197581 A1 | 7/2015 | Asadauskas |
| 2015/0361318 A1 | 12/2015 | Crews |
| 2016/0333132 A1 | 11/2016 | Shiromoto |
| 2017/0283615 A1 | 11/2017 | Williams |
| 2018/0057686 A1 | 3/2018 | Williams |

* cited by examiner

*Primary Examiner* — Deve V Hall
(74) *Attorney, Agent, or Firm* — Boris Leschinsky

(57) ABSTRACT

A bitumen polymer additive comprises a base of tire rubber crumbs in the amount of about 70 to about 90 percent by weight of tire rubber crumbs sized about 14 mesh or smaller. Added to that base is about 0.5 to about 5 percent by weight of a benzothiazole-based devulcanizing agent, about 0.3 to about 3 percent by weight of a $C_{14}$-$C_{18}$ heavy metal soap such as a zinc stearate, about 0.1 to about 3 percent by weight of an antiozonant, and about 0.1 to about 20 percent of a plasticizer such as a heavy oil. The additive polymer is used for producing an asphalt of superior quality, including lower initial viscosity and improved wear resistance.

7 Claims, 1 Drawing Sheet

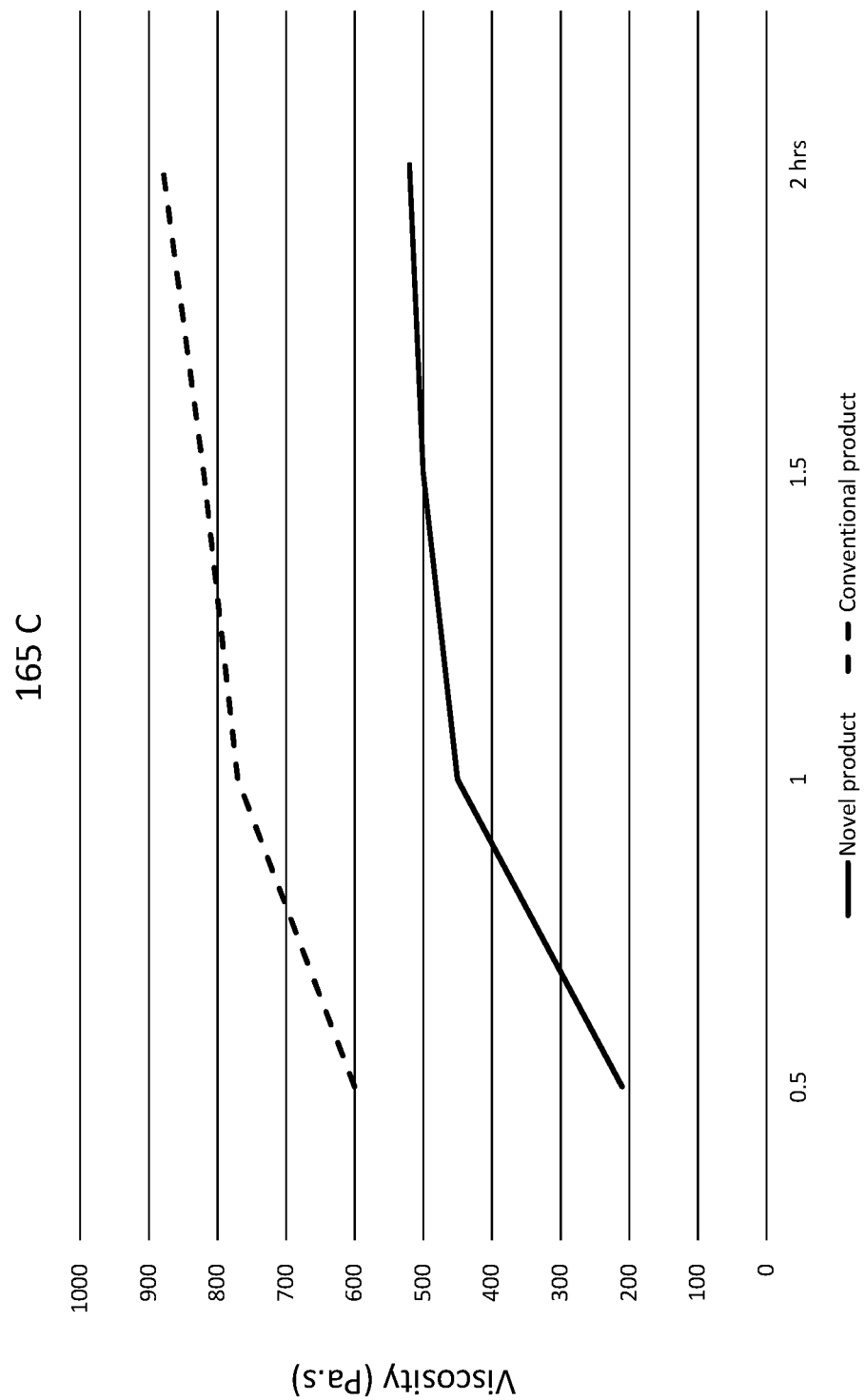

TIRE CRUMB-BASED BITUMEN POLYMER FOR PRODUCING A LOWER VISCOSITY ASPHALT WITH IMPROVED TOLERANCE TO HIGH TEMPERATURES

BACKGROUND OF THE INVENTION

Without limiting the scope of the invention, its background is described in connection with road surfacing construction and many other parts of a roadway construction. More particularly, the invention describes the addition of polymers to bitumen for use in asphalt products. While asphalt is used mostly in road construction, the scope of the present invention covers other uses of asphalt—for example in roof shingles and commercial roofing.

Asphalt binder may be characterized generally as an organic cementitious material in which the predominant constituents are bitumens as they may occur in nature or as they may be produced as byproducts in petroleum refining operations. Asphalt binder can generally be characterized as a dark brown or black solid or highly viscous liquid, which incorporates a mixture of paraffinic and aromatic hydrocarbons as well as heterocyclic compounds containing Group 15 or 16 elements, such as nitrogen, oxygen or sulfur.

Asphalt binders have many industrial applications involving use as paving or road surfacing materials, waterproofing material, roofing applications, etc. Perhaps the most widespread use of asphalt binder compositions is in road surfacing and paving applications. The asphalt binder may be used alone, such as where it is applied to the surface of an existing paving structure—as tack coat or an emulsion-based product—or it may be used as a hot mix asphalt (HMA) material which is a composition of an asphalt binder (4 to 10% by weight) and aggregates in a compacted format. Other additives are added also, if needed, to the mixture.

Cracking induced by fatigue is considered a primary mode of distress in asphalt pavements. The viscoelastic properties of the asphalt binder determine to a great extent the fatigue performance of asphalt mixes (Bahia et al., "Characterization of Modified Asphalt Binders in SUPERPAVE MIX DESIGN (2001)). The fatigue resistance of binders is currently characterized using the fatigue parameter, $G^* \sin \delta$. This parameter is determined using a Dynamic Shear Rheometer (DSR) measurements at 1% strain rate, as per AASHTO T315, to ensure that the asphalt binder remains within the linear viscoelastic region.

The asphalt binders can be modified through the use of polymers. Polymers cover a wide range of modifiers, with elastomers (rubbers or elastics) and plastomers (plastics) being the most commonly used methods of modifications. Styrene-butadiene rubber (SBR) and styrene-butadiene-styrene (SBS) are the most frequently elastomers. These polymers are used in industry to reduce rutting and improving the fatigue and thermal cracking resistance. Polymer-modified asphalts or "PMA" function to provide improved wear and longevity characteristics as a paving material which is advantageous for use on major highways—but at the expense of having to overcome a substantially increased viscosity during the production and paving processes.

In addition to many polymers, it is generally considered to be a conventional practice to incorporate crumb rubber modifiers (CRM) into a bitumen material to form asphalt paving or sealing materials. Such scrap or recycled rubber particles are also referred to as ground tire rubber (GTR) or tire rubber crumbs or tire crumbs and can include materials recovered from a variety of tire carcasses, reclaimed tire treads, crumbs obtained from passenger and or truck tires, mining and agricultural tires and the like. For the purposes of this description, the terms "tire crumbs", "tire rubber crumbs", "ground tire rubber", "crumb rubber modifier" are used interchangeably.

The asphalt base material incorporating such tire rubber crumbs and particles can be of any suitable type such as derived from petroleum refining operations and include aliphatic and aromatic hydrocarbons and heterocyclic compounds, including asphaltenes and maltenes of fairly high molecular weight. Aggregate particles as described above, ranging from sand to crushed rock the size of perhaps ¼-½ inch, or larger, can also be incorporated into the asphalt base material. In addition, in many cases, a blend of asphalt binder can be applied as a sealer coat on top of existing road paving. Such sealing coats typically may be a thickness of ⅛-¼ inch and may incorporate aggregate and additive materials, or relatively finely ground aggregate materials can be dispensed on the sealer coat while it is hot, immediately after its application or after allowing the sealer to set for a period of a few hours or days. Yet another procedure for providing an asphalt/aggregate road composition involves depositing a layer of the aggregate material on a substrate surface such as a road bed or the like and thereafter depositing the asphalt binder material on the layer of aggregate to provide a layer of water proofing materials on top of the structure.

The term "tire crumbs" and other similar terms listed above as used herein, can mean but are not limited to any suitable form of rubber for use in preparing a rubber-modified asphalt, such as particles, granules, and/or other particulate forms (e.g., shavings or flakes, fines, beads, powder, or the like), which can be produced and/or processed in any manner (such as via vulcanization, devulcanization, ambient grinding and/or cryogenic grinding or other methods). Moreover, tire rubber crumbs can exist in suitable size prior to formation of the rubber-modified asphalt products.

In the United States, over 300 million used automotive tires are discarded annually after they have been worn-out during their limited service life. These used tires are essentially a variety of vulcanized rubber products. In some cases, they are hauled to a dump because there is very little use for them after they have served their original intended purpose. A limited number of used tires are utilized in building retaining walls, as guards for protecting boats and similar things where resistance to weathering is desirable. Efforts to reclaim scrap vulcanized rubber have primarily included a physical shearing process, which is suitable for a rubber which can be mixed with asphalt, forming asphalt rubber.

During the vulcanization process of rubber, accelerators, promoters, and/or initiators, are used to form large numbers of sulfur crosslinks. After vulcanization, the crosslinked rubber becomes very stable and cannot be easily reformed into other products. Thus, vulcanized rubber products generally cannot be simply melted and recycled into new products. The sulfur crosslinks which are present in used vulcanized rubber, such as tire rubber, are deleterious in a subsequent curing process which uses used vulcanized rubber as a component in a new polymer mixture. Formulations of tire rubber which use more than minor amounts of vulcanized rubber result in a brittle cured end product unsuitable for many uses such as automobile or truck tires.

In light of the foregoing, various techniques for devulcanizing rubber have been developed. For example, in one devulcanization process, vulcanized rubber is placed in an organic solvent to recover various polymerized fractions as taught in Butcher, Jr. et al., U.S. Pat. No. 5,438,078. Platz, U.S. Pat. No. 5,264,640 teaches taking scrap rubber from used tires and regenerating the monomeric chemicals which are subsequently recovered. This method uses gaseous ozone to break down the crosslinked structure of the rubber followed by thermal depolymerization in a reaction chamber. Platz et al., U.S. Pat. No. 5,369,215 teaches a similar process in which used tire material may be depolymerized under elevated temperatures and at a reduced pressure to recover the monomeric compounds. Myers et al., U.S. Patent No. 5,602, 1 6 discloses a process for devulcanizing rubber by desulfurization. comprising the steps of: contacting vulcanized crumb rubber with a solvent and an alkali metal to form a reaction mixture, heating the reaction mixture in the absence of oxygen and with mixing to a temperature sufficient to cause the alkali metal to react with sulfur in the crumb rubber, and maintaining the temperature below that at which thermal cracking of the rubber occurs, thereby devulcanizing the crumb rubber. Hunt et al., U.S. Pat. No. 5,891,926 is directed to a devulcanization process for rubber in which elevated temperatures and pressures are used to partially devulcanize the rubber. Thereafter, a solvent 2-butanol is used to extract the devulcanized rubber from the non-rubber and/or solids component.

Novotny et al., U.S. Pat. No. 4,104,205 discloses a technique for devulcanizing sulfur-vulcanized elastomer containing polar groups which comprises applying a controlled dose of microwave energy of between 915 MHz and 2450 MHz and between 41 and 177 watt-hours per pound in an amount sufficient to sever substantially all carbon-sulfur and sulfur-sulfur bonds and insufficient to sever significant amounts of carbon-carbon bonds. Other patents directed to microwave techniques include Lai et al. U.S. Pat. No. 4,440,488; Hayashi et al., U.S. Pat. No. 4,469,817; Picker. U.S. Pat. No. 4,665,101; and Wicks et al., U.S. Pat. No. 6,420,457. In general, the application of microwave energy results in uneven heating of the elastomer. As such, the degree to which the elastomeric particles are devulcanized vary within the rubber particle, which is typically most evidenced by different surface and interior properties.

Despite the various devulcanization processes known the art, there remains a need to develop improved devulcanization techniques, especially those that are capable of devulcanizing the tire crumbs in a relatively uniform manner and make it suitable as a bitumen additive for subsequent use in asphalt products in a cost-effective method.

SUMMARY OF THE INVENTION

Accordingly, it is an object of the present invention to overcome these and other drawbacks of the prior art by providing novel compositions for a tire crumb-based bitumen additive which is suitable for use in an asphalt being used in many applications.

It is another object of the present invention to provide a bitumen additive which does not appreciably change the viscosity of asphalt so as to simplify road construction and asphalt paving using thereof.

It is a further object of the present invention to provide process for manufacturing of a polymer (bitumen additive) of consistent quality despite differences in its starting components from one batch to the next.

It is yet a further object of the present invention to provide a polymer (bitumen additive) capable of producing an improved asphalt with wear and longevity characteristics similar to that of a polymer-modified asphalt (e.g., increased tolerance to high temperature), but without greatly increased viscosity typically associated with the use of such polymer additives.

Bitumen additives of the present invention generally comprise a base of tire rubber crumbs in the amount of about 70 to about 90 percent by weight of tire rubber crumbs sized about 14 mesh or smaller. Added to that base is about 0.5 to about 5 percent by weight of a benzothiazole-based devulcanizing agent, about 0.3 to about 3 percent by weight of a $C_{14}$-$C_{18}$ heavy metal soap such as a zinc stearate, about 0.1 to about 3 percent by weight of an antiozonant, and about 0.1 to about 20 percent of a plasticizer such as a heavy oil.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 is an exemplary chart of viscosity comparing a novel asphalt product with a conventional asphalt product.

DETAILED DESCRIPTION OF PREFERRED EMBODIMENTS OF THE INVENTION

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the FIGURES, can be arranged, substituted, combined, and designed in a wide variety of different configurations, all of which are explicitly contemplated and make part of this disclosure.

Tires come in a great variety of sizes and compositions. Recycling of tires and production of tire crumbs, in many cases, is not a uniform and well controlled process. Various tire crumbs differ from each other considerably in a great number of ways including:

Crumb size;
Tire chemical composition;
Methods of producing tire crumbs.

Despite these differences, the objective of recycling of tires is to use them again in any way possible. Road construction, in many locations, accounts for a large portion of using recycled tire products. Asphalt-paved roads need to exhibit superior longevity and minimal wear—in a variety of weather conditions. To achieve this objective, the asphalt composition has to be tightly controlled—therefore making use of recycled tire crumbs very difficult due to the substantial differences between different tire crumb batches.

The present invention addresses this difficulty by providing a bitumen additive composition with components, the content of which can be adjusted to accommodate tire crumbs of variable sizes and variable chemical compositions, thereby producing a polymer as the end product, the bitumen additive itself, of consistent and reproducible quality.

Bitumens include solid, semisolid, or viscous substances, natural or manufactured, composed principally of high molecular weight hydrocarbons. The base of a bitumen additive composition of the present invention is a plurality of tire rubber crumbs of a certain size. In embodiments, crumbs less than about 1.5 mm in size corresponding to 14 mesh may be used.

In exemplary embodiments, greater than about 80%, 85%, or 90% by weight of the tire rubber crumbs, relative to the total weight of the tire rubber crumbs, may have a size of less than about 14 mesh (such as less than about 16 mesh, less than about 18 mesh, less than about 20 mesh, less than about 25 mesh, less than about 30 mesh, less than about 35 mesh, less than about 40 mesh, less than about 45 mesh, less than about 50 mesh, less than about 60 mesh, less than about 70 mesh, or even less than about 80 mesh) in accordance with U.S. Sieve series.

Such tire crumbs may account for about 70 to about 90 percent by weight of the entire bitumen additive. In embodiments, tire crumbs may account for about 70%, about 75%, about 80%, about 85%, about 90% or another proportion by weight inbetween these values. Of course, once mixed with the bitumen and after forming a new polymerized asphalt, the percentage of tire crumbs in the final product will be substantially less.

As compared to at least some of the disclosures found in the prior art, the tire crumbs are modified using a variety of chemical compounds as described below in greater detail. Unmodified tire crumbs are believed to cause absorption of various components from the bitumen, most notably various oils contained therein. This may lead to an increase in the size of the individual tire crumbs as well as cause further swelling when the ambient temperature changes. Fluctuations in tire crumb size due to temperature changes may ultimately lead to formation of microcracks and premature aging of the final product. The present invention is believed to address this problem by chemically modifying tire crumbs and reducing or even preventing their size changes due to fluctuations in ambient temperature.

In embodiments, several other chemical components may be added to the tire crumbs base in order to manufacture the bitumen additive of the present invention. Such additional chemical compounds are now described in greater detail.

Benzothiazole-Based Devulcanizing Agent

A first component of the additive of the present invention is a non-halogenated 5-member heterocyclic compound, specifically a benzothiazole. In embodiments, this component may account for about 0.5 to about 5 percent of the final bitumen additive by weight. It is contemplated to use about 0.5%, about 0.75%, about 1%, about 1.25%, about 1.5%, about 1.75%, about 2%, about 2.5%, about 3%, about 3.5%, about 4%, about 4.5%, about 5% of any amount inbetween of the benzothiazole-based devulcanizing agent.

The term "vulcanized" for the purposes of this description refers to a three-dimensional crosslinked structure between the elastomer (e.g. rubber) molecules. Thus, the term "vulcanized rubber" encompasses rubbers having a three-dimensional crosslinked structure between rubber molecules. The introduction of the crosslinked structure into automotive tires may be performed by various crosslinking methods known to those skilled in the art, such as those involving sulfur vulcanization, thiuram cure, peroxide vulcanization, and the like.

The term "devulcanized" is used herein to indicate that certain surface and bulk properties of the crosslinked vulcanized elastomer (e.g. vulcanized tire rubber) have been chemically altered by the application of certain chemical compounds described herein, referred to as a devulcanizing agent. In general, a number of mono, di, and polysulfides which formed original sulfur polymer crosslinks in the tire rubber during the initial vulcanization process may be reduced by using the devulcanizing agent. It is understood that some crosslinking may remain in the end product.

The devulcanizing agent may be used to initiate and accelerate the process of at least partial devulcanization of the tire crumbs. In embodiments, the devulcanizing agent may be benzothiazole-based. Benzothiazole and its derivatives are known to be used in manufacturing of tires. Exemplary benzothiazole-based agents include: Benzothiazole, 2,2'-Bibenzothiazoline, 4-(2-Benzothiazolyldithio)morpholine, 5-Bromo-2-methylbenzothiazole, (2-Benzothiazolylthio)acetic Acid, 3-(2-Benzothiazolylthio)propionic Acid, 6-Bromo-2-benzothiazolinone, 3-(2-Benzothiazolyl)-7-(diethylamino)coumarin, Ethyl 2-(2-Benzothiazolyl)acetate, 2(3H)-Benzothiazolone, 2-(4-Bromophenyl)benzothiazole, (+)-Benzotetramisole, (−)-Benzotetramisole, S-(2-Benzothiazolyl), (Z)-2-(2-Amino-4-thiazolyl)-2-(methoxyimino)thioacetate, 2-Bromobenzothiazole, 6-Bromo-2-chlorobenzothiazole, 2-Chlorobenzothiazole, N-Cyclohexyl-2-benzothiazolylsulfenamide, 5-Chloro-2-benzothiazolinone, 2-Cyano-6-methoxybenzothiazole 2-Benzothiazolyl Diethyldithiocarbamate, 2,2'-Dibenzothiazolyl Disulfide, 2-(2,4-Dinitrophenylthio)benzothiazole, 2,5-Dimethylbenzothiazole, 2,6-Dimethylbenzothiazole, 2,6-Dichlorobenzothiazole, 3-Ethylbenzothiazolium Bromide, Ethyl Benzothiazole-2-carboxylate, 2-Fluorobenzothiazole, 5-Fluoro-2-methylbenzothiazole, 2,5,6-Trimethylbenzothiazole, 2-(2-Thienyl)benzothiazole, Tiaramide Hydrochloride, and Zinc 2-Mercaptobenzothiazole.

Heavy Metal Soap

Traditionally, zinc oxide is used to activate vulcanization process. For the purposes of this invention, it was unexpectedly discovered that a heavy metal soap, and in particular a $C_{14}$-$C_{18}$ heavy metal soap, may be used advantageously to achieve this purpose as well as a purpose of preventing the tire crumbs from adhering to one another.

One example of such metal soap is zinc stearate. Zinc stearate is a "zinc soap" that is widely used industrially. In this context, soap is used in its formal sense, a metal "salt" of a fatty acid. Other useful heavy metal soaps that may be used for the purposes of the present invention are zinc oleate and zinc palmitate.

In embodiments, the amount of a heavy metal soap may vary from about 0.3% to about 3% and may be about 0.3%, about 0.5%, about 0.7%, about 0.9%, about 1%, about 1.25%, about 1.5%, about 1.75%, about 2%, about 2.25%, about 2.5%, about 2.75%, about 3%, or any value inbetween.

Antiozonant

A further yet compound of the bitumen additive of the present invention is an antioxidant, and in particular an antiozonant. Generally speaking, an antiozonant, also known as anti-ozonant, is an organic compound that prevents or retards the degradation of material caused by ozone (ozone cracking). Antiozonants are used as additives to plastics and rubber, especially in tire manufacturing.

In embodiments, the amount of the antiozonant may vary from about 0.1% to about 3% and may be about 0.1%, about 0.3%, about 0.5%, about 0.7%, about 0.9%, about 1%, about 1.25%, about 1.5%, about 1.75%, about 2%, about 2.25%, about 2.5%, about 2.75%, about 3%, or any value inbetween.

One useful example of an antiozonant is a p-Phenylenediamine (often abbreviated PPD), which is an organic compound with the formula $C_6H_4(NH_2)_2$. PPD is easily oxidized, and for this reason derivatives of p-Phenylenediamine may be used as antiozonants. One useful example of a p-Phenylenediamine derivative is N-Isopropyl-N'-phenyl-1,4-phenylenediamine (often abbreviated IPPD), with a chemical formula $C_{15}H_{18}N_2$.

Plasticizer

A further component of the bitumen additive is a plasticizer. The primary role of the plasticizer is to transport above described chemical compounds inside the tire crumbs. In embodiments, a heavy oil may be used to serve as a plasticizer.

Heavy oils are typically provided in the form of a dark brown, free-flowing liquids. Sources of these heavy oils may include those made from the gasification, pyrolysis or liquefaction of carbonaceous materials such as coal, shale, tar sand, bitumen, biomass, and the like. These heavy oil sources are often distributed in locations far from large central processing facilities that are required to upgrade these oils to useful products such as middle distillate fuels, and the like.

Heavy oils suitable for the purposes of the present invention may be selected to have a boiling temperature of not less than about 300 degrees C.

It may be preferred to use heavy oils with viscosity from about 0.1 to about 3 pascal seconds measured at about 25 degrees C.

In embodiments, the amount of the plasticizer may vary from about 0.1% to about 20% and may be about 0.1%, about 0.5%, about 1%, about 1.5%, about 2%, about 3%, about 5%, about 7%, about 9%, about 10%, about 12%, about 14%, about 16%, about 18%, about 20%, or any value inbetween.

To manufacture the bitumen additive of the present invention, all above components may be mixed together at a temperature of about 40-50 degrees C. until an even mixture is produced, which appears as a black powder.

When in use, the bitumen additive of the present invention provides several key advantages in asphalt or asphalt-based products. First, it simplifies road construction and paving by having lower viscosity than a conventional product—see an exemplary viscosity over time chart in FIG. 1. Lower viscosity initially and predictably lower viscosity over the first few hours when the asphalt paving is expected to take place may help the field compaction during road construction and allow using the novel product not only on highways but on local roads as well.

Second, the novel bitumen additive provides superior tolerance to high temperatures and therefore improves longevity of the asphalt.

In embodiments, bitumen additive may be used to produce an asphalt or an asphalt product, including a warm-melt flowable mixture of warm asphalt suitable for road paving or sealing purposes. An asphalt product does not need to be roller compacted when implemented. It should thus be easily cast and spread. Examples of asphalt products include, in particular, asphalts, sealants, pavement seals and heat sealing materials.

In one embodiment, the asphalt product may also be provided in the form of asphalt concrete or an asphalt mixture. The asphalt mixture may further include fibers and a mineral aggregate. The mineral aggregate may include lime dust and/or granular ceramic material. Mineral aggregates of the present invention may include elements of less than 0.063 mm and optionally aggregates originating from recycled materials, sand with grain sizes between 0.063 mm and 2 mm and optionally grit, containing grains of a size greater than 2 mm, and optionally alumino-silicates. Aluminosilicates are inorganic compounds based on aluminium and sodium silicates or other metal such as potassium or calcium silicates. Aluminosilicates reduce the viscosity of the warm-mix and are in the form of a powder and/or granulates. The term granulates refers to mineral and/or synthetic granulates, especially coated material aggregates, which are conventionally added to bituminous binders for making mixtures of materials for road construction.

In another embodiment, the asphalt product may be used in roofing shingles or commercial roofing applications. In this case, the portion of tire crumbs in the asphalt may be increased, in some embodiments up to 30 percent. For a roofing-grade asphalt material, roofing granules can be applied to a surface of a coated base material. The roofing granules can be used for ultraviolet radiation protection, coloration, impact resistance, fire resistance, another suitable purpose, or any combination thereof. In addition, in these applications a more viscous asphalt binder is needed. The roofing granules can include inert base particles that are durable, inert inorganic mineral particles, such as andesite, boehmite, coal slag, diabase, metabasalt, nephaline syenite, quartzite, rhyodacite, rhyolite, river gravel, mullite-containing granules, another suitable inert material, or any combination thereof. See U.S. Patent Publ. No. 2013/0160674 to Hong et al., which is hereby incorporated by reference in its entirety. In another embodiment, the asphalt product is used in a recycled asphalt pavement aggregate.

Roofing granules may also include one or more surface coatings over the shingle. The surface coating can cover at least approximately 75% of the surface of the shingle and may or may not have a uniform thickness. If more than one surface coating is used, a surface coating closer to the shingle can include a binder that can be inorganic or organic. An inorganic binder can include a silicate binder, a titanate binder, a zirconate binder, an aluminate binder, a phosphate binder, a silica binder, another suitable inorganic binder, or any combination thereof. An organic binder can include a polymeric compound. In a particular embodiment, an organic binder can include an acrylic latex, polyurethane, polyester, silicone, polyamide, or any combination thereof. One or more additional organic binders of the same or different composition can be used.

A surface coating may also or alternatively include a solar reflective material that helps to reflect at least some of the solar energy. For example, UV radiation can further polymerize or harden the asphalt within roofing product being fabricated. A solar reflective material can include titanium dioxide, zinc oxide, or the like. Alternatively, the solar reflective material can include a polymeric material. In one embodiment, a polymer can include a benzene-modified polymer (e.g., copolymer including a styrene and an acrylate), a fluoropolymer, or any combination thereof. Other solar reflective materials are described in U.S. Pat. No. 7,241,500 to Shiao et al. and U.S. Publ. Nos. 2005/0072110 to Shiao et al. and 2008/0220167 to Wisniewski et al., all of which are incorporated by reference for their teachings of materials that are used to reflect radiation (e.g., UV, infrared, etc.) from the sun.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A bitumen additive for use in an asphalt, said bitumen additive comprising:
    about 70 to about 90 percent by weight of said entire bitumen additive of tire rubber crumbs sized about 14 mesh or smaller,
    about 0.5 to about 5 percent by weight of said entire bitumen additive of a benzothiazole-based devulcanizing agent,
    about 0.3 to about 3 percent by weight of said entire bitumen additive of a $C_{14}$-$C_{18}$ heavy metal soap,
    about 0.1 to about 3 percent by weight of said entire bitumen additive of an antiozonant, and
    about 0.1 to about 20 percent by weight of said entire bitumen additive of a plasticizer.

2. The bitumen additive as in claim 1, wherein said benzothiazole-based devulcanizing agent is selected from a group consisting of Benzothiazole, 2,2'-Bibenzothiazoline, 4-(2-Benzothiazolyldithio)morpholine, 5-Bromo-2-methylbenzothiazole, (2-Benzothiazolylthio) acetic Acid, 3-(2-Benzothiazolylthio)propionic Acid, 6-Bromo-2-benzothiazolinone, 3-(2-Benzothiazolyl)-7-(diethylamino)coumarin, Ethyl 2-(2-Benzothiazolyl)acetate, 2(3H)-Benzothiazolone, 2-(4-Bromophenyl)benzothiazole, (+)-Benzotetramisole, (−)-Benzotetramisole, S-(2-Benzothiazolyl), (Z)-2-(2-Amino-4-thiazolyl)-2-(methoxyimino)thio acetate, 2-Bromobenzothiazole, 6-Bromo-2-chlorobenzothiazole, 2-Chlorobenzothiazole, N-Cyclohexyl-2-benzothiazolylsulfenamide, 5-Chloro-2-benzothiazolinone, 2-Cyano-6-methoxybenzothiazole 2-Benzothiazolyl Diethyldithiocarbamate, 2,2'-Dibenzothiazolyl Disulfide, 2-(2,4-Dinitrophenylthio)benzothiazole, 2,5-Dimethylbenzothiazole, 2,6-Dimethylbenzothiazole, 2,6-Dichlorobenzothiazole, 3-Ethylbenzothiazolium Bromide, Ethyl Benzothiazole-2-carboxylate, 2-Fluorobenzothiazole, 5-Fluoro-2-methylbenzothiazole, 2,5,6-Trimethylbenzothiazole, 2-(2-Thienyl)benzothiazole, Tiaramide Hydrochloride, and Zinc 2-Mercaptobenzothiazole.

3. The bitumen additive as in claim 1, wherein said $C_{14}$-$C_{18}$ heavy metal soap is selected from the group consisting of zinc stearate, zinc oleate and zinc palmitate.

4. The bitumen additive as in claim 1, wherein said antiozonant is p-Phenylenediamine.

5. The bitumen additive as in claim 1, wherein said antiozonant is n-isopropyl-n'-phenyl-p-phenylenediamine.

6. The bitumen additive as in claim 1, wherein said plasticizer is a heavy oil.

7. An asphalt or an asphalt product comprising the bitumen additive as in claim 1.

* * * * *